United States Patent Office.

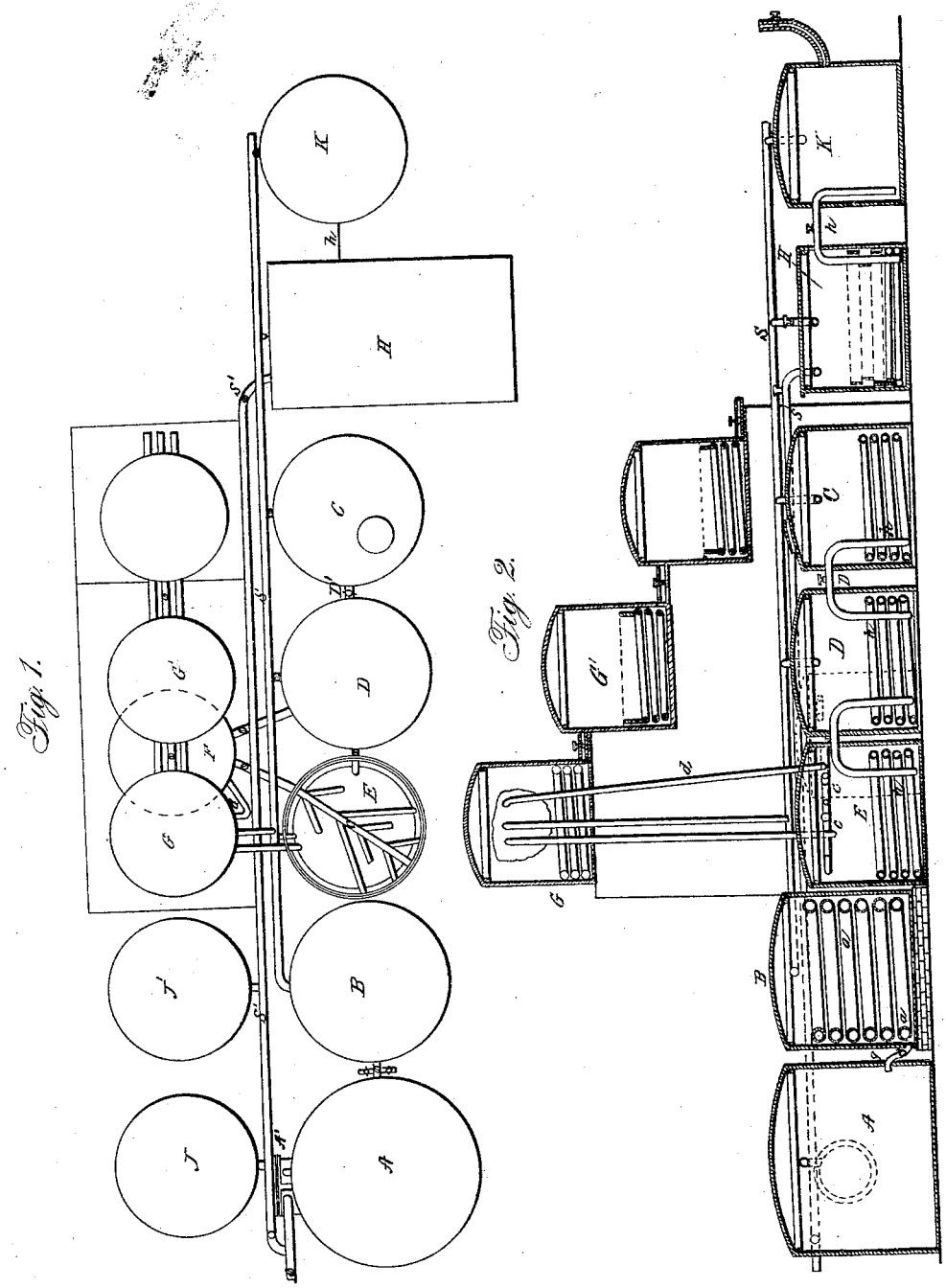
D. BRUCE.
Extracting Oils.
No. 61,315.
Patented Jan. 22, 1867.

DUNCAN BRUCE, OF ROSSVILLE, NEW YORK.

Letters Patent No. 61,315, dated January 22, 1867; antedated January 17, 1867.

IMPROVED APPARATUS FOR DECOMPOSING ANIMAL AND VEGETABLE SUBSTANCES, FOR CURING MEAT, TANNING, &c.

The Schedule referred to in these Letters Patent and making part of the same.

TO ALL WHOM IT MAY CONCERN:

Be it known that I, DUNCAN BRUCE, of Rossville, Richmond county, State of New York, have invented a new and improved Apparatus for Decomposing Animal and Vegetable Matters, and also for curing meat; and I do hereby declare that the following is a full, clear, and exact description thereof, reference being had to the accompanying drawings, making a part of this specification, in which—

Figure 1 is a top view of the apparatus.
Figure 2 is a sectional view of the same.

Similar letters of reference indicate corresponding parts in the several figures.

This invention relates to an improved apparatus for digesting and decomposing animal and vegetable and animal matters, and also for curing meat, by exposing such substances in vacuo and, then regulating their temperature by means of steam, as will be hereinafter described.

To enable others skilled in the art to understand my invention, I will describe its construction and operation.

In the accompanying drawings, A represents a vacuum reservoir, which is provided with a suitable exhausting engine, by means of which air can be drawn out of said reservoir. This vessel A communicates with a condensing vessel, B, which contains cool water, circulating through the space outside of the worm $a$. In the chamber C, through a man-hole, the animal matter, such as intestines, sinews, &c., &c., is put in a dry or natural state and heated to a temperature of about 100°, by means of a steam heater, $b$. Air is then pumped into this vessel C, under the substances therein, by means of the forcing and exhausting engine A', which air, with the moist heat, will quickly decompose these substances and reduce them to a liquid state. In the chamber D, I have a steam heater, $b$, and in this chamber I put bone dust, guano, charcoal, shale, or other suitable absorbent, which is to compose part of the fertilizer, which substance or substances are intended to absorb the animal juices. This chamber D is heated, as above stated, and a vacuum, created in it by the pump or engine A', which will draw off any moisture remaining in vessel D; the connection D' is then opened by means of a stop-cock, and the animal juices drawn into it from the vessel C, which juices will be absorbed by the substances in the vessel D. The matter in the vessel D is allowed to digest for about two days, when air is exhausted from this vessel until the matter is thoroughly dry; it is then removed and used for manuring land.

For obtaining oil and fatty matters from bones, fish, and other animal substances: Such matters are put into open baskets, and introduced into the vessels D and E, and boiled with a suitable quantity of water, steam heat being used for boiling purposes so as to avoid danger of burning. When the grease has boiled out of the substances in said vessels it is collected and drawn off in the following manner: the water is drawn from the vessel D into the vessel E, by means of the vacuum pump A' so as to raise the grease in E on a level with the branch tubes $c\ c$; the same is done for drawing off the grease from the vessel D. The grease is drawn into the receiver F from both vessels D and E, through pipes shown in fig. 1. The boxes or baskets containing the bones are removed from the vessels D and E, and a vacuum created therein for concentrating the remaining liquid and making gelatine or glue. The vessel F has a steam or hot-water heater in it for keeping the grease in a fluid state, and this vessel communicates with the elevated vessel G, by means of a pipe, $d$, and the grease is drawn into G by vacuum, and here filtered upward through animal charcoal or other suitable filtering medium. The grease is drawn from this vessel G into another vessel, G', where it is again filtered, and if desired it may be still further purified by conducting it through several more filtering and heating vessels.

For curing meat: The vessel H, like the other vessels, may be made cylindrical, but I prefer to make this vessel rectangular. Vessel H communicates with the condensing worm in the vessel B, and also with the reservoir A, by means of a long pipe, S. It also communicates by means of the pipe S' with the forcing and condensing engine A', and also with one or more reservoirs, J J', which latter contains smoke, the other dry air. This vessel H also communicates with another vessel, K, containing brine, by means of a pipe, $h$, extending to the bottom of each vessel. The vessel H may be furnished with perforated shelves between which the meat and other matters to be treated are confined. The object of these partitions is to separate the substances in layers to allow of a free circulation of air or brine through the entire mass. Between the vessels A and B there is a pipe, $g$, which is provided with two branch pipes, having stop-cocks applied to them. These two branch pipes should lead into the tops of two air-tight vessels, placed lower than the vessel B, for the purpose of receiving the condensed liquid from this vessel B, thereby preventing such liquid from being drawn off into the vacuum reservoir. In the process of treating meat, the vessel H is tightly closed, after the meat is put into it, when a communication is made between this vessel and the vacuum reservoir A, the brine from vessel K is then allowed to rush into the vessel H and insinuate itself into the spiracles of the meat, so as to completely charge it with salt. For smoking meat in the chamber H, the air is first exhausted from this chamber, and then a communication between it and the chambers J J' opened, for the purpose of charging the meat with smoke. Meat may be quickly and thoroughly dried by my improved apparatus, by forcing currents of dry air through it, employing for this purpose the exhausting and forcing-pump, as above stated. I propose to connect the worms which are arranged in some of the vacuum vessels with pipes leading to and from a steam boiler so as to heat the entire apparatus by means of a single boiler. The several pipes connecting the several vessels with each other, and also with a long pipe leading to the vacuum reservoir, should be provided with stop-cocks, so that communications can be made and shut off, when desired, between the several vessels. I propose to make the vacuum reservoir in comparison with the other vessels, with which it communicates, very large, so that there shall be no loss of time in transferring the liquids, heated air, or smoke, from one vessel into another, when a communication is made between said vessels.

My improved apparatus will be found very useful for drying and preserving all kinds of plants and herbs; also for impregnating substances with any odor, by means of gases or scents admitted to them when in the drying-chamber, and the air partially exhausted from it; and also for dissolving the vegetable substances enveloping the fibres of textile plants. I also contemplate using the apparatus for tanning hides. In this latter process, the hair and flesh are first removed from the hides when they are placed in the chamber H, so as not to touch each other, and a powerful vacuum formed as above described. This will expand the hides to such a degree that they will become very porous and dry, so that when the tanning liquor is admitted into said chamber it will penetrate every part of each hide. By this process the liquor will not be weakened in entering the hides, as the latter are made thoroughly dry by the vacuum which is previously formed.

Having thus described my invention, what I claim as new, and desire to secure by Letters Patent, is—

1. An apparatus, consisting of a series of air-tight vessels, communicating with a condensing vessel, and also with a vacuum reservoir, having a forcing and exhausting engine applied to it, the whole to be used substantially as described in the treatment of vegetable or animal matters.

2. Curing meat by the means and in the manner substantially as herein described.

3. The process substantially as described of obtaining grease from fatty substances, by subjecting these substances to the action of moist heat in a vacuum.

DUNCAN BRUCE.

Witnesses:
R. T. CAMPBELL,
EDW. SCHAFER.